(12) United States Patent
Grant Williams

(10) Patent No.: US 7,953,672 B2
(45) Date of Patent: *May 31, 2011

(54) PROCESS AND ARCHITECTURE FOR STRUCTURING FACILITIES REVENUE BOND FINANCINGS

(76) Inventor: Linda Grant Williams, Bedford, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 12/753,264

(22) Filed: Apr. 2, 2010

(65) Prior Publication Data

US 2010/0257088 A1    Oct. 7, 2010

Related U.S. Application Data

(63) Continuation-in-part of application No. 11/681,166, filed on Mar. 1, 2007, which is a continuation-in-part of application No. PCT/US2006/031358, filed on Aug. 11, 2006, which is a continuation of application No. 11/202,194, filed on Aug. 12, 2005.

(51) Int. Cl.
*G06Q 10/00* (2006.01)
(52) U.S. Cl. ........................ 705/307; 705/313
(58) Field of Classification Search .............. 705/35, 705/36 R, 38–40, 307, 313–315; 707/607
See application file for complete search history.

(56) References Cited

U.S. PATENT DOCUMENTS

| 6,154,730 | A  | * | 11/2000 | Adams et al. ........... 705/36 R |
| 2002/0040339 | A1 | * | 4/2002 | Dhar et al. ............... 705/38 |
| 2002/0156709 | A1 | * | 10/2002 | Andrus et al. ........... 705/35 |
| 2003/0028479 | A1 | * | 2/2003 | Kirksey .................... 705/38 |
| 2003/0130865 | A1 | * | 7/2003 | Fitzgibbon et al. ....... 705/1 |
| 2004/0098329 | A1 | * | 5/2004 | Tilton ...................... 705/36 |
| 2005/0119962 | A1 | * | 6/2005 | Bowen et al. ............ 705/37 |

OTHER PUBLICATIONS

U.S. CMBS Legal and Structure Finance Criteria, Standard & Poor's Ratings Services, May 2003, Section 4.*
Lisa Sanders' article Denver Sports Arena Opens New Doors by Using Asset Backed Financing, Bond Buyer, May 28, 1998, vol. 324, issue 30402, p. 43.*

* cited by examiner

*Primary Examiner* — Mary Cheung
(74) *Attorney, Agent, or Firm* — Williams Mullen; Timothy J. Bechen

(57) ABSTRACT

A process and architecture may be implemented to structure ESFRB financing or refinancing for Municipal Facilities operation, construction and/or renovation to improve economic and business terms for involved or interested parties, including without limitation, a Municipal Entity which owns, for example, water/sewer facilities, airports, seaports, bus and train transit systems, toll roads and bridges, parking lots and/or energy plants.

21 Claims, 9 Drawing Sheets

INVENTION ARCHITECTURE

GROUND LEASE/LEASE ASSIGNMENT/
SUBLEASEBACK ARCHITECTURE

INVENTION ARCHITECTURE

GROUND LEASE PLUS
LOAN STRUCTURE

FIG. 7 INVENTION ARCHITECTURE

PROCESS AND ARCHITECTURE FOR STRUCTURING FACILITIES REVENUE BOND FINANCINGS

RELATED APPLICATIONS

This application is a Continuation-in-part of U.S. application Ser. No. 11/681,166 filed Mar. 1, 2007 which is a Continuation-in-part of PCT/US06/31358, filed Aug. 11, 2006 which is a Continuation of U.S. Ser. No. 11/202,194, filed Aug. 12, 2005, all entitled "Process And Architecture For Structuring Facilities Revenue Bond Financings."

BACKGROUND OF THE INVENTION

The present invention generally relates to financing structures/architectures associated with municipal bond financing methods that may improve ratings on municipal bonds issued in connection with the construction or renovation of consistently high demand, high revenue-producing municipal assets such as, for example, energy plants, water and sewer facilities, toll roads, bridges, bus and train systems, parking lots and garages, parking meters, airport cargo and passenger terminals and seaports (herein, a "Municipal Facility" or "Municipal Facilities") and thereby increase the cost effectiveness of any financing of such Municipal Facilities.

Conventionally, in facilities revenue bond financings, bonds issued to finance the construction or renovation of Municipal Facilities have been supported by the credit of the consolidated balance sheet of a municipality, joint powers authority or other municipally-created entity having jurisdiction or oversight over such Municipal Facilities (herein, a "Municipal Entity"). Such bonds are referred to as Consolidated Balance Sheet Municipal Bonds or "CBSMBs". Sometimes the Municipal Entity whose consolidated balance sheet is evaluated to determine the credit rating on debt issued to finance specific Municipal Facilities may be far less creditworthy than the Municipal Facilities themselves on a stand-alone basis, or the Municipal Entity may be unable to timely repay various debt obligations due to economic problems, or the Municipal Entity may even have filed for bankruptcy protection. Rather than being forced to sell such stand-alone, strong revenue producing Municipal Facilities to one or more private companies to obtain much needed cash, the Municipal Entity may elect to use the technique described herein to raise capital without an outright sale of such Municipal Facilities to the private sector.

SUMMARY OF THE INVENTION

In accordance with at least one embodiment of the invention, a financing process and architecture may be implemented to initially structure or restructure revenue bond financings for Municipal Facilities. This process and architecture may be used for the construction and/or renovation and/or ongoing operation and maintenance of a specific Municipal Facility in a manner which can substantially improve the credit rating assigned to any such bond financing and thereby improve the economic and legal terms of such bond financing to the benefit of all interested parties, including taxpayers and the municipalities that serve them. A municipal facility may include, but not be limited to, an airport, water, sewer, light rail, toll road or any other suitable operating entity.

DETAILED DESCRIPTION OF INVENTION

Figure 1:
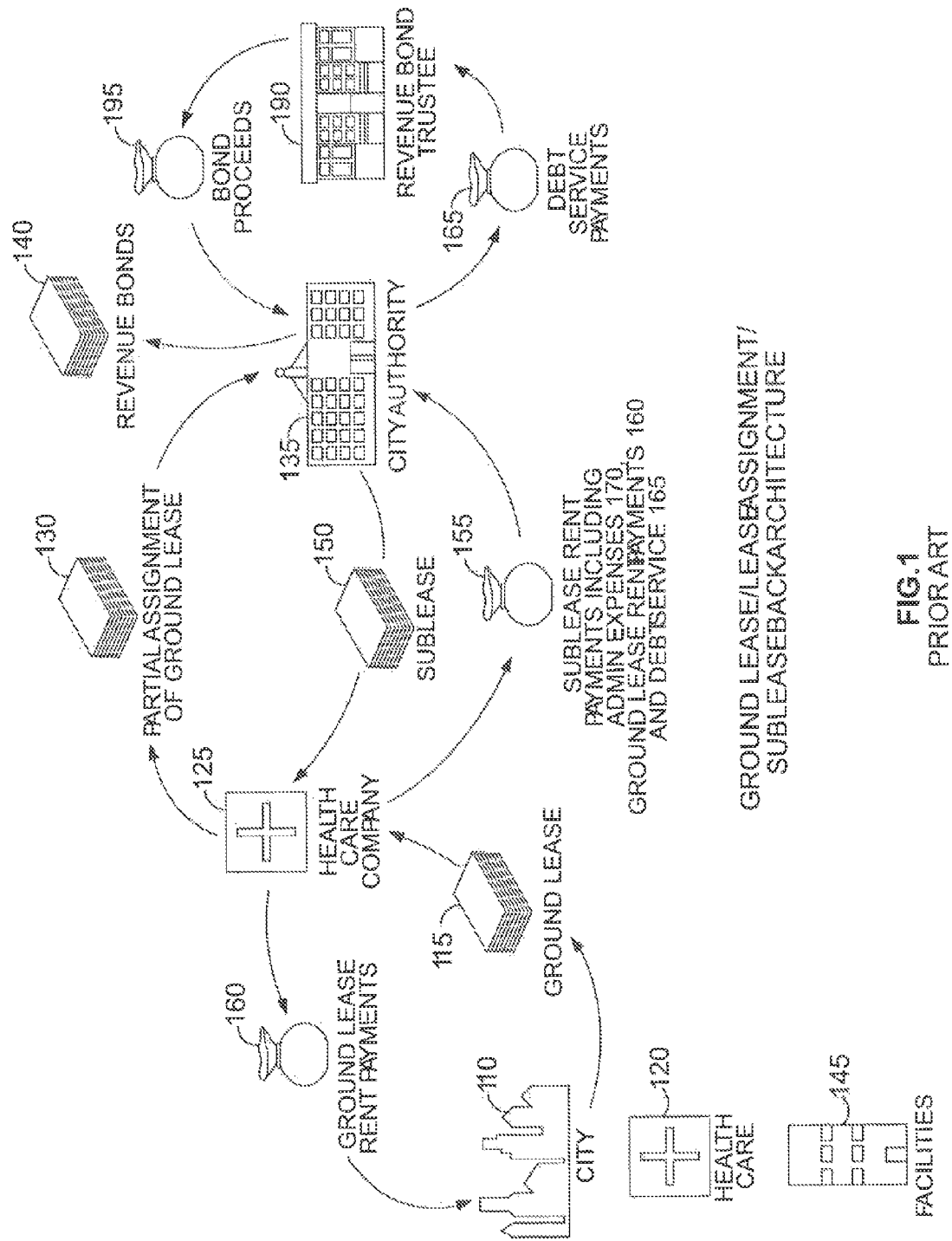
FIG. 1 illustrates an existing, conventional "ground lease/lease assignment/subleaseback" financing architecture.

Although various invention embodiments are disclosed herein in the context of the financing or refinancing of Municipal Facilities, it should be understood that the invention may be implemented in connection with the financing or refinancing of all manner of high demand, consistently high revenue-producing municipally owned assets through the issuance of enhanced special facility revenue bonds ("ESFRBs") for any such facility for public and/or multiple private user benefit. The issuance of the ESFRBs described herein is an alternative, novel approach and may be used instead of issuing CBSMBs, which may not be practical or cost-effective. Invention embodiments may be implemented in connection with the financing or refinancing of all manner of Municipal Facilities, whether formerly or currently publicly or privately owned, where municipal facilities include, but are not limited to, airport, water treatment facility, sewer, etc. Thus, it should be understood that utility is provided by invention embodiments in any business scenario wherein single or multiple municipally owned or supported facilities are constructed or renovated for use by the public and/or multiple private entities using funds obtained through the issuance of taxable or tax-exempt municipal bonds or other evidences of indebtedness and are financed based solely on the legal structure, demand for use and predictable future revenue streams generated by such Municipal Facilities.

In accordance with at least one embodiment of the invention, the inventive concept may be implemented to complete new or restructured financings of Municipal Facilities in order to avoid, or to partially or fully remedy, problems associated with the low or declining credit ratings of the Municipal Entities that own or operate them. In that particular implementation, rather than the issuance of CBSMBs, in which the financing for a Municipal Facility is supported in whole or in part by the consolidated balance sheets of one or more sponsoring Municipal Entities, the process and architecture of ESFRBs would instead be used to improve the credit rating of the municipal financing and thereby lower debt service costs for taxpayers and the municipalities that serve them. In such an implementation, the process and architecture may apply both to new financings of Municipal Facilities as well as refinancings of existing Municipal Facilities financings, and may be implemented to assist in insulating any Municipal Facilities financing from a bankruptcy of the Municipal Entities which own the relevant Municipal Facilities and/or the primary operators and users thereof. Such implementation of this process and architecture may allow such Municipal Entities to raise much needed cash, but at the same time may be used to avoid an outright "fire-sale" of such Municipal Facilities to the private sector or to provide lower cost financing in connection with a privatization of such Municipal Facilities.

A key to the success of any such financing or refinancing situation, is that the revenue-producing potential of a Municipal Facility should be well recognized. If there is sufficient potential demand for the services or improvements furnished by such Municipal Facility to the public and/or multiple private users, such demonstrable demand and the resulting predictable future cash flow, together with use of the legal structure described herein, may together provide a better credit than that of the consolidated balance sheet of the relevant Municipal Entity. In such instances, third party credit, equity support from private sources and the use of asset-backed financing techniques may be applied to finance or refinance the Municipal Facility on an underlying basis that is supported only by the demonstrable high demand for use of the services or improvements of the Municipal Facility and the predictable future revenues to be derived from such use, as evidenced by subscriptions, contracts with towns, counties and states, leases, contingent leases and "waiting lists" and, critically, by the credit of a single-purpose business entity, which may be a statutory trust or limited liability company, that is designed to meet all or any portion of the published rating agency criteria (such a single-purpose business entity being referred to herein as an "SPE") such that the rating may be based in large part on demand for services or improvements furnished by the Municipal Facility. This SPE would typically lease or otherwise contract with the Municipal Entity for the right to operate the Municipal Facilities, and in turn would sublease such rights in respect of the Municipal Facilities to another operating entity or otherwise contract with third parties for their use. The SPE would have rights to all present and potential revenues of the Municipal Facilities. The SPE would be structured to permit a bond financing that would be remote, or insulated, from the bankruptcy of the Municipal Entity as well as any subtenants or other public or private users of the Municipal Facilities such that the underwriting risks associated with such bond financing would be limited solely to those relating to the financial viability of the Municipal Facilities, thereby allowing ESFRBs to be issued instead of CBSMBs, as has traditionally been done.

This new financing process and architecture is applicable to new Municipal Facilities and also the refinancing, or any private and/or public refunding, or a combination of public and private refunding, of CBSMBs or any other type of outstanding municipal bond issuance with respect to any existing Municipal Facilities and may be used in connection with any privatization of such Municipal Facilities.

A conventional "ground lease/lease assignment/subleaseback" architecture involves a Municipal Entity leasing ground to an operating entity and that entity partially assigning ground lease rights to a separate government agency acting as a bond issuer. The government agency bond issuer issues CBSMBs or other municipal bonds to finance construction or continuing operation of the Municipal Facilities and subleases the partially-assigned ground lease rights and facilities back to such operating company in return for sublease rent on terms sufficient to support repayment of the financing of the arrangement. The sublease may be keyed to the maturity of the bonds; the ground lease partial assignment may be coterminous with the sublease. Additionally, both the sublease and the partial ground lease assignment terminate on prepayment of such municipal bonds. As a result, the purported Municipal Entity may have no residual interest in the financed Municipal Facilities that survives retirement of the bonds.

Recently, various bankruptcy court decisions (see United Airlines, Inc. v. HSBC Bank USA, N.A., No. 04-4209 (7th Cir. Jul. 26, 2005) rev'g HSBC Bank USA v. United Air Lines, Inc., 317 B.R. 335 (N.D. Ill. 2005) (San Francisco International Airport) and In re UAL Corp., 307 B.R. 618 (Bann N.D. 111. 2004) affd in part by United Air Lines, Inc. v. HSBC Bank USA, 322 B.R. 347 (N.D. Ill. 2005) (Denver International Airport) and by The Bank of New York v. United Air Lines, Inc., No. 04-2838 (N.D. Ill. Feb. 16, 2005) (JFK International Airport)) have held that a "package ground lease," as utilized at the Denver airport, was a true lease whereas "ground lease/lease assignment/subleaseback" architectures of the type briefly described above were merely disguised debt financings, allowing a user to remain in possession and relegating the bondholders to the status of prepetition creditors in the user's bankruptcy, rather than having the benefit of the more favorable legal position afforded lessors under Section 365 of the U.S. Bankruptcy Code. The two lease "ground lease/lease assignment/subleaseback model has been declared a disguised financing. On Mar. 7, 2006, the United States Supreme Court denied review of that decision, so all financings so structured will not be upheld as true leases. The Denver-style single lease model was affirmed as a true lease by the United States Court of Appeals for the Seventh Circuit on Jul. 6, 2006 and United has agreed not to appeal. The effects of these decisions is that the "ground lease/lease assignment/subleaseback" architecture will not be upheld as a true lease for purposes of Section 365 of the Bankruptcy Code in the event of a bankruptcy of a lessee, but the Denver style single lease will be so upheld. This analysis of leases as to whether they are "true leases" extends by analogy to leases by and to Municipal Entities and to Municipal Facilities similarly financed. Alternatively, short term leases may be used which may be continuously renewed but expire in accordance with their terms following the bankruptcy of a tenant.

This legal deficiency affects both the attractiveness and plausibility of both new single facility revenue bond financings and existing special facility revenue bond financings structured as a ground lease/lease assignment and leaseback, where an existing financing requires a new credit judgment (e.g., on a proposed refinancing of the bonds, or on replacement of an expiring credit support facility). The deficiency may be corrected by amending the leases and subleases involved to either be short-term renewable leases or longer term leases which meet the criteria for "true leases" enumerated by the Seventh Circuit Court of Appeals.

With this business context understood, invention embodiments apply common third party equity or credit support and/or asset-backed financing techniques to issue municipal bonds, or to refinance existing municipal bonds, on a basis supported primarily by the demonstrable future demand and revenues created by the services and improvements furnished by the Municipal Facility and the creditworthiness of an SPE operating the Municipal Facility to be financed as opposed to the credit of the Municipal Entity owner or any public or private primary users, operators and/or tenants of the Municipal Facility. Thus, in a scenario involving either the "ground lease plus loan" or "ground lease/lease assignment/subleaseback" architectures, if the revenue-producing potential of the Municipal Facility may provide a superior credit risk than that of the consolidated balance sheet of the Municipal Entity owning it or the private business entities or consumers currently utilizing its services or improvements, common asset-backed financing techniques may be applied in recognition of the inherent value of the real estate and to isolate the strongest and most reliable revenue stream(s) through the use of third party credit and/or private equity, but in all events the creation of an SPE largely insulated from a possible bankruptcy of the Municipal Entity or the public or private primary users or operators of the Municipal Facility.

For affected cash-strapped municipalities, this inventive architecture and its associated creative process could eliminate the need of a Municipal Entity to sell outright or otherwise wholly "privatize" its high revenue-producing assets and, in some circumstances, whether in a privatization or otherwise, may significantly lower the effective debt service costs associated with any municipal bond financing of the Municipal Facilities. For credit-enhancement providers on existing CBSMBs, this inventive architecture and process could generate restructuring fees and lower or eliminate their exposure to declining credit ratings of sponsoring Municipal Entities, their cash constrained balance sheets and associated potential municipal insolvency issues. For bond underwriters, this architecture and process could provide an opportunity for new transactions and refinancing existing CBSMBs providing meaningful benefits to Municipal Entities owning such self-sustaining, high revenue-producing Municipal Facilities. This architecture and process for issuance of ESFRBs could provide a mechanism to largely insulate successful operations of Municipal Facilities from credit exposure to the bankruptcy risks associated with the Municipal Entity or any public or private primary users, investors and sponsors. The use of independent managers and directors or the use of managers unrelated to one or more of the direct or indirect equity owners of a limited liability company or a trust similarly designed to meet all or any portion of the rating agency criteria for bankruptcy remoteness is a critical element of this inventive architecture and its associated creative process and is employed to substantially reduce associated bankruptcy risks and to permit a rating agency to find that the SPE is "separate", whether or not all its rating agency criteria are met by the structure and operation of the SPE.

Figure 2:
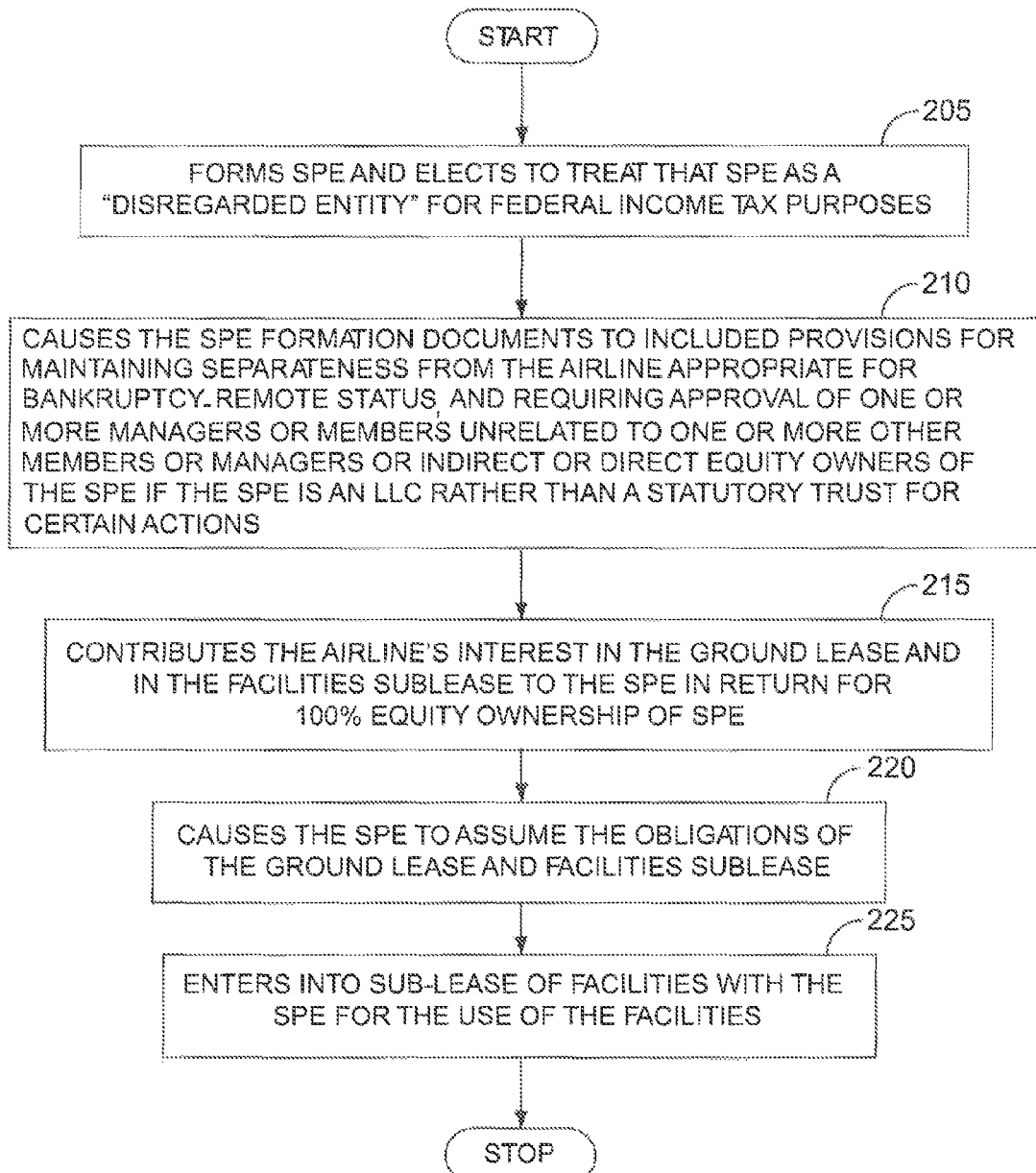
FIG. 2 illustrates various operations performed in connection with restructuring financing architectures in accordance with at least one embodiment of the invention.

A first example of a potential implementation of the above described embodiments is now provided beginning with FIG. 2. Although, with reference to FIG. 1, consider an existing, conventional "ground lease/lease assignment/subleaseback" financing architecture, wherein a city or other Municipal Entity 110 has entered into a ground lease 115 of its water/sewer facility 120 to a municipal water/sewer operating company 125. Such water/sewer operating company 125 has partially assigned 130 the ground lease 115 to bond issuer 135 (e.g., an agency or instrumentality of city or other Municipal Entity 110). Issuer 135 has issued CBSMBs 140 to finance the construction or permanent financing of, e.g., the water/sewer facilities 120. Issuer 135 has used the bond proceeds 195 to construct the water/sewer facilities, and has then subleased 150 the assigned ground lease 130 and the associated improvements built thereon to the municipal water/sewer operating company 125 in exchange for the undertaking of municipal water/sewer operating company 125 to pay sublease rent payments 155 equal in aggregate amount to a portion of the related ground lease rent payments 160, the debt service 165 on the municipal bonds 140, and administrative expenses 170 relating to the bonds 140. After application to pay related ground lease rents 160, the balance of such sublease rents 155 is provided to the revenue bond trustee 190 to pay administrative expenses 170 and the debt service on the CBSMBs 140. Debt service payments 165 are directed to the revenue bond trustee to be disbursed to bond holders.

In accordance with at least one embodiment of the invention, the Municipal Entity and/or water/sewer operating company 125 might undertake restructuring transactions as described with reference to FIG. 2. As illustrated in that figure, at 205, the Municipal Entity and/or airport and/or water/sewer operating company and/or any other suitable municipal entity, may contract with third party private equity providers to provide capital and substitute credit through creation of an SPE owned in whole or in part by such third party equity provider or (as illustrated) the airport, water, sewer or any other municipal operating entity itself could form an SPE and elect to treat that SPE as a "disregarded entity" for federal income tax purposes. In the latter circumstance illustrated at 210, the airport, water, sewer or any other municipal operating entity shall cause the SPE formation documents to include one or more elements of the customary and standard rating agency criteria for maintaining "separateness" from the airport, water, sewer or any other municipal operating entity including, for example, the creation of a statutory trust or a limited liability company (with at least one "independent manager" or other member or manager unrelated to one or more of the direct or indirect equity owners of the water/sewer operating company), and providing that SPE is not authorized to take certain actions (for example, to liquidate or to file in bankruptcy, to dispose of substantial assets or to amend its formation documents) without the approval of at least two if not all its members and managers, including independent managers, if any. Subsequently, at 215, the Municipal Entity airport, water, sewer or any other municipal operating entity may contribute its interest in the ground lease and in the Municipal Facilities sublease to the SPE. The contributed sublease interest may include the constructed Municipal Facilities and the airport, water, sewer or any other municipal operating entity's interests in certain contracts for payments from consumers and others using the airport, water, sewer or any other municipal operating entity services and other third party contracts and leases necessary for the operation of the airport, water, sewer or any other municipal operating entity facilities. The airport, water, sewer or any other municipal operating entity may then, at 220, cause the SPE (whether wholly or partially owned by the Municipal Entity, the water/sewer operating company, airlines, end users of the Municipal Facilities or third party private equity providers) to assume the obligations of the ground lease, the Municipal Facilities sublease, and any other sub-subleases. Subsequently, or concurrently, at 225, the municipal water/sewer operating company or airport or airline or otherwise owned SPE may enter into a sub-sublease of the Municipal Facilities with the SPE for the airport, water, sewer or any other municipal operating entity's continuing use and operation of the Municipal Facilities. That sub-sublease may entail, for example, the airport, airline, water, sewer or any other municipal operating entity agreeing to pay a market rent at least equal to the ground lease payments and the operating costs of the airport (terminals or other facilities), water, sewer or any other municipal operating entity Municipal Facilities, including the sublease obligations of the SPE. Also, that sub-sublease would entail terms sufficient to support the creditworthiness of the arrangement and to permit the conclusion that any sublease or sub-sublease is either a short-term renewable lease or is a longer term lease which qualifies as a "true lease" for federal bankruptcy purposes. All rights and revenues of the SPE including sublease rental amounts paid by the airport, water, sewer or any other municipal operating entity may then be pledged to secure the SPE's assumed sublease obligations, and thus, the repayment of the ESFRBs (and the obligations to any credit support provider, if applicable).

It should be understood that the actions performed in FIG. 2 are merely illustrative of particular implementation options in accordance with at least one embodiment of the invention. Therefore, it is not necessary that the actions be performed in the order illustrated in FIG. 2; rather, each of those actions may be performed in various orders including simultaneously. Moreover, it should be understood that practice of the invention may not require performing all of the operations set forth in that figure or that those operations be performed specifically by the airport, water, sewer or any other municipal operating entity; instead they may readily be performed by other private or public third party entities. Furthermore, the illustration in FIG. 2 is presented with reference to a airport, water, sewer or any other municipal operating entity and certain ground lease and Municipal Facilities subleases, but the methodology has application to other entities desirous of financing a Municipal Facility such as a municipal bus or train transit system, parking lot or garage or airport or seaport or any portions thereof, for example.

Moreover, throughout the explanation of various invention embodiments, reference is made to an SPE, which may be, for example, any business entity such as a limited liability company (LLC) or a statutory trust organized in Delaware or in any other jurisdiction that enables favorable treatments for the purposes of bankruptcy and tax, but in each case, must be structured to include at least one or more of the elements set forth in published SPE criteria as amended, modified, waived or ignored from time to time by the major U.S. rating agencies.

To potentially establish a higher credit rating (e.g., investment grade) and, therefore markedly more favorable interest rates, the SPE may, or may not, be vulnerable to unrestricted voluntary liquidation or dissolution in the event of a bankruptcy of the airport, water, sewer or any other municipal operating entity owner/ground lessor or other third party equity holder, or subject to substantive consolidation in a bankruptcy of any of the airport, water, sewer or any other municipal operating entity, municipal owner/ground lessor or other third party private equity owner. For the former purpose, if the SPE is a limited liability company, its formation documents may provide for management including at least one independent manager or a member or manager that is unrelated to any one or more direct or indirect equity owners of the SPE, which managing member or members could be appointed by the Municipal Entity, a credit-support provider or other party. They could also be appointed by a company typically providing corporate trust services for these types of structures. The SPE formation documents may further provide that the SPE could not take certain actions (for example, to file in bankruptcy or undergo a voluntary liquidation or dissolution, dispose of substantial assets, or to amend its formation documents) without the approving vote of at least two unrelated members or managers, including the independent managers, if any. Similar safeguards would apply to any such SPE created in the form of a statutory trust.

To try to avoid substantive consolidation in bankruptcy, the SPE may establish its "separateness" from the Municipal Entity owning the Municipal Facilities, any private or municipal water/sewer operating company or any other third party private equity holder, if any, based on one or more of the various customary standards that have been set forth by the major rating agencies (e.g., Moody's Investors Service, Fitch Ratings or Standard & Poors Corporation), as such criteria may be amended, modified, waived or ignored by such agencies from time to time. One or more of these standards could be incorporated into the SPE's formation documents, which control its operation—e.g., the SPE will restrict its activities to only those necessary or incidental to its leasehold interests, management and operation of the Municipal Facilities, (whether for itself or as delegated to another party) and not engage in other businesses or activities, the SPE will hold itself out to the public as a legal entity separate and apart from its Municipal Entity owner and/or third party private equity members or trust owners or any other person, having its own assets, liabilities and operations—not constituting a branch or division of any of its members, affiliates or any other person, and not being liable for the debts of any such other person, for example.

Other such provisions suggested by the rating agencies may include the SPE undertaking (e.g., in the formation documents of the SPE) that the SPE will do any one or more of the following: act to (i) segregate its funds, property and other assets from those of any member or any other person and hold them in its own name, and not comingle them with those of any member or any other person; (ii) make any investments solely in its own name; (iii) not form any subsidiaries; (iv) act solely in its legal name in the conduct of its business, and conduct its business so as not to mislead others as to the identity of the entity or assets with which they are concerned; (v) keep and maintain separate records, books of account, bank accounts and financial statements; (vi) ensure that its capitalization is adequate in light of its business and purpose; (vii) not (a) guarantee, become obligated for, or otherwise hold itself out as being liable for, the debts and obligations of any member or any other person; (b) pledge its assets for the benefit of any other person; (c) make loans or advances to any person other than in the ordinary course of its business; and (d) acquire obligations or securities of any member; (viii) not enter into any transaction with any member, except upon terms and conditions that are intrinsically fair and substantially similar to those that would be available on an arms length basis with unrelated third parties. (ix) maintain an arm's-length relationship with its members and any affiliates; (x) allocate fairly and reasonably any overhead including for office space and employees shared with any member; (xi) use its own separate stationery, invoices, checks and other business forms and have its own telephone number, facsimile number and Internet domain; (xii) take commercially reasonable steps to correct any known misunderstanding regarding its separate identity; (xiii) file its own tax returns, if applicable, as may be required under applicable law; (xiv) pay its liabilities out of its own funds, including the salaries of its own employees, if any; and (xv) not engage in any dissolution, liquidation, consolidation, merger or sale of assets. For the avoidance of doubt, the owner(s) of the SPE need not cause the SPE formation documents to include all or any particular portion of such features so long as the end result is that the bonds are rated based on demand and revenues of the SPE as opposed to the credit of its owners or primary tenants or other users of the Municipal Facilities.

Further, in order to establish and maintain "separateness" from the applicable Municipal Entity as ground lessor/owner and the SPE's parent entities (water/sewer operating company, third party private equity investors or the Municipal Entity, or other public/private entity), it may be important that any sub-sublease of a portion of the Municipal Facilities from the SPE back to the water/sewer operating company or other users, as well as the ground lease with the Municipal Entity owner of the assets, be on an "arms-length" basis. To avoid "disguised financing treatment," any such ground leases, leases, subleases and sub-subleases must meet the Seventh Circuit's criteria for a true lease or be a short-term renewable lease. From an economic standpoint, a primary user of the Municipal Facilities may undertake to make payments on terms sufficient to support the creditworthiness of the arrangement and to permit the conclusion that the ground lease, lease, sublease or sub-sublease are each "true leases" for federal bankruptcy purposes.

Figure 3:
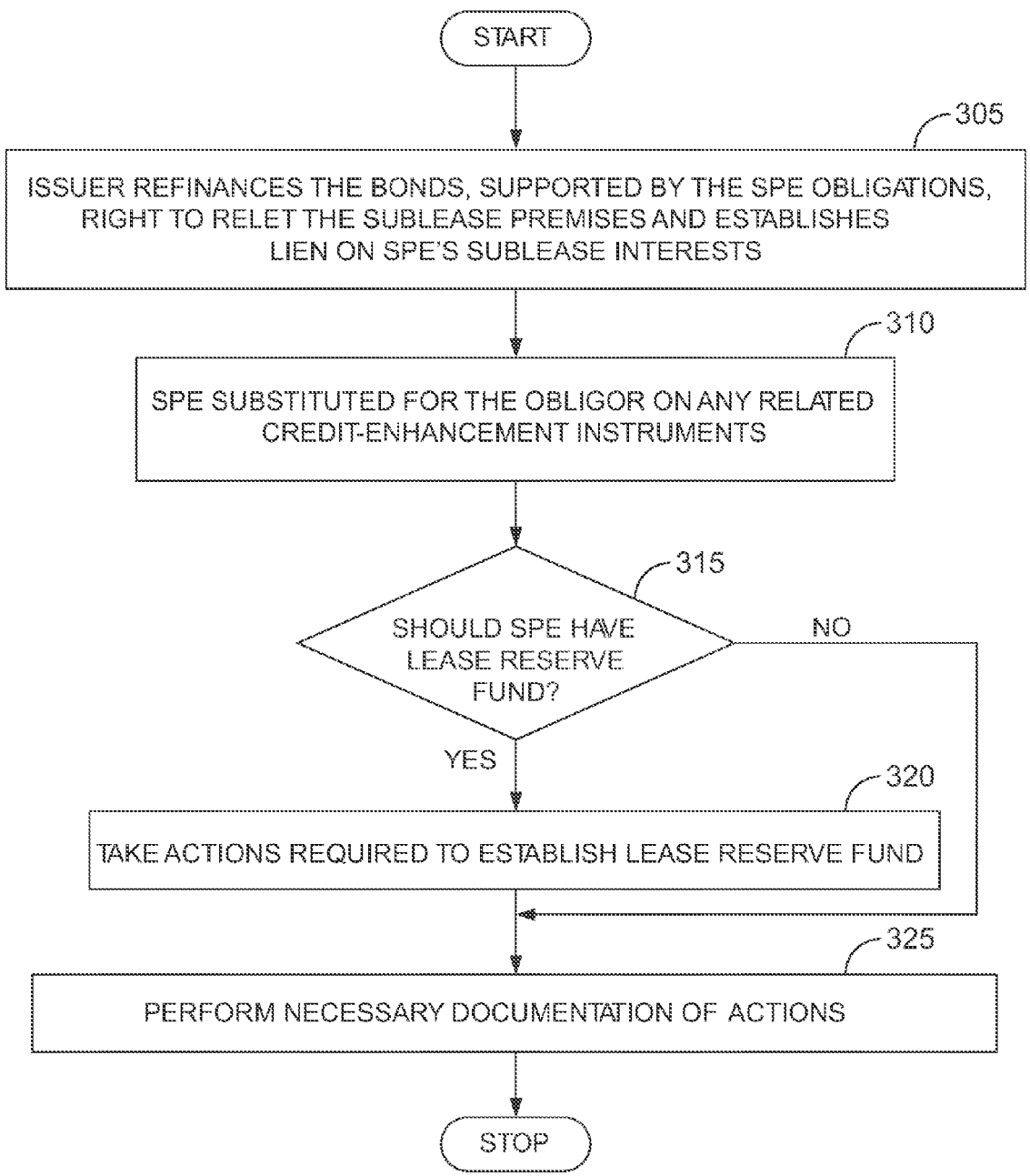
FIG. 3 illustrates various operations performed in connection with restructuring financing architectures in accordance with at least one embodiment of the invention.

Assuming that the facts would support the creditworthiness of the actions illustrated in FIG. 2, various actions may be taken, as illustrated in FIG. 3. For example, at 305, an issuer could then refinance the CBSMBs with ESFRBs, supported only by the SPE's obligations and the pledge of rights to subleases, sub-subleases and revenue associated with use, occupancy and operation of the Municipal Facility. Subsequently, at 310, SPE is substituted for the airport, water, sewer or any other municipal operating entity as the lessee from the Municipal Entity with respect to any related credit-support arrangements for the bonds. A determination may then be made, at 315, as to whether the SPE should reserve some portion of its revenues in a lease reserve fund to provide greater assurance of its ability to pay lease rent payments on a timely basis, e.g., to cover rental payments during any relet period. If it is determined that such a fund should be created, associated actions would be performed at 320 and operations would continue at 325. For that purpose, it may be sufficient simply to debit the fund to pay operating costs, if needed. If it is determined that no such lease reserve fund is necessary, the appropriate documentation of the actions performed in FIGS. 2 and 3 may be made at 325.

Again, it should be understood that the actions performed in FIG. 3 are merely illustrative of particular implementation options in accordance with at least one embodiment of the invention. Therefore, it is not necessary that the actions be performed in the order illustrated in FIG. 3; rather, those actions may be performed in various orders including simultaneously. Moreover, it should be understood that practice of the invention may not require performing all of the operations set forth in that figure or that those operations be performed specifically by the party identified in that figure or as described above.

Figure 4:
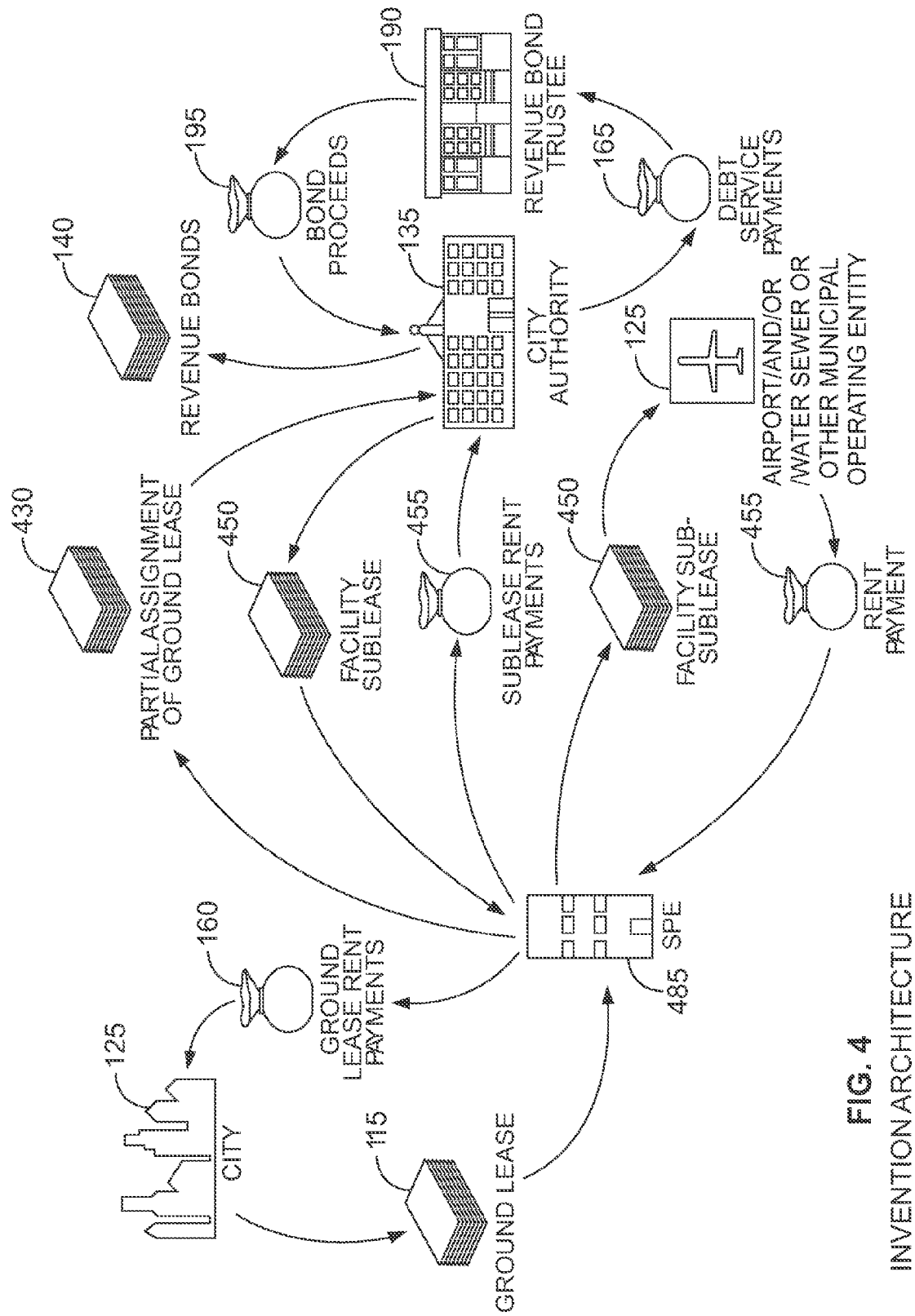
FIG. 4 illustrates a restructured financing architecture provided in accordance with at least one embodiment of the invention.

As illustrated in FIG. 4, subject to appropriate documentation, this restructured architecture might permit the CBSMBs 140 to be refinanced on the strength of the SPE legal structure, the demonstrable demand for the services and/or improvements furnished by the Municipal Facility, and the credit, predictable future revenues and resources of the SPE 485 (whether funded primarily by the airport, water, sewer or any other municipal operating entity or third party private equity investors). Additionally, although the ESFRBs 140 could be subject to the exposure of a possible bankruptcy of the SPE 485 (the risk of which should be evaluated by the rating agencies, bondholders or the credit-support provider, if applicable), the ESFRBs 140 should be sufficiently remote from a bankruptcy of the equity holders of the SPE (including, if applicable, the airport, airlines, water, sewer or any other municipal operating entity and any third party private equity investors) 125 as to be priced and rated on the essentiality of services, the demonstrable demand for the Municipal Facilities 145, and the rights and predictable future revenues, legal structure and credit of the SPE and not the water/sewer operating company subtenant, Municipal Entity, third party private equity investors, an airline or shipping company tenant or user, or other primary tenants and users of the Municipal Facility 125.

The strength of the essentiality of services and improvements and the demonstrable demand for the Municipal Facilities is key to this architecture and may be determined using computational means, thereby allowing for the assignment of a credit rating by a credit rating agency. The computation means includes a computer program or computer processing device electronically performing processing operations. One embodiment includes determining computer-generated credit factors associated with the financing. This determination may include the accessing, assembling, processing, collating, or any other suitable data processing/manipulation of available electronic data, such as, for example, demand data available from one or more electronic data repositories, as recognized by one skilled in the art. The computational means may also include electronic delivery of the credit factors determined using the processing or computational machine/device. The electronic delivery can be via any suitable means including data transmission using known or any suitable data transmission technique, but may also include physical delivery, such as data storage on a physical readable medium and the delivery consummated when the data is read from the storage medium. The delivery enables the credit rating agency to assign a credit rating thereto in accordance with known operations and based in significant part on data computed by a data processing program.

In FIG. 4, the SPE 485 has acquired the airport, water, sewer or any other municipal operating entity's interest in the ground lease and in the Municipal Facilities lease. The contributed Municipal Facilities lease interest may include the constructed Municipal Facilities and may also permit the SPE to sublease interests to other operators and/or end users of the Municipal Facilities. The SPE 485 has assumed the municipal operating company's obligations under the Municipal Facilities lease (and the ground lease). The water/sewer operating company 125 has entered into a sublease of the Municipal Facilities 450 with the SPE 485 for the airport, water, sewer or any other municipal operating entity's own use and operation of the Municipal Facilities 145. The lease to the SPE and the sublease by the water/sewer operating company or airline/airport SPE, as the case may be, for the Municipal Facilities shall either be short-term renewable leases/subleases or be longer-term leases/subleases which meet the Seventh Court of Appeals' criteria of a "true lease". The sublease may entail the airport, water, sewer or any other municipal operating entity agreeing to pay a rent on terms sufficient to support the creditworthiness of the arrangement and to permit the conclusion that the sublease and any sub-sublease are "true leases" for federal bankruptcy purposes. All rights and revenues of the SPE (from whatever source) may then be pledged to secure the bonds (and the credit support provider, if applicable). To the extent permitted by the transaction documents and applicable law, the SPE could make periodic distribution of surplus revenues to its equity holders and, if applicable, pay operating and management fees to any third parties necessary to profitably operate and manage the Municipal Facilities.

As a result of such a restructured architecture, there may be a corresponding reduction in the interest charges for which the SPE 485 is responsible, through its Municipal Facilities sublease debt service payments to the issuer 130. Alternatively, if the bonds 140 are supported by a letter of credit, bond insurance or other credit support, this restructured architecture could result in a substantial reduction in the charges of the credit-support provider.

Figure 5:
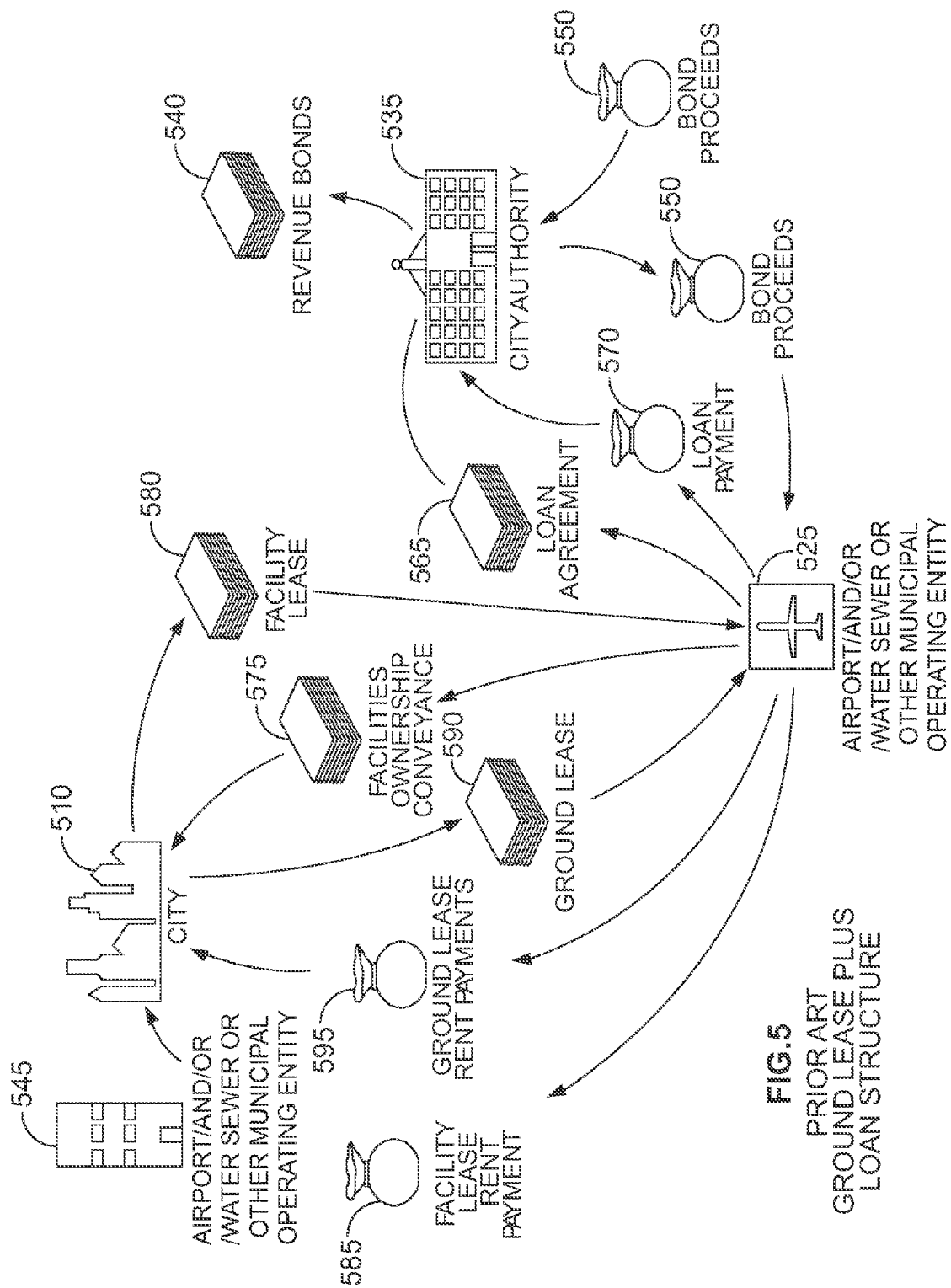
FIG. 5 illustrates an existing, conventional "ground lease plus loan" financing architecture.
Figure 6:
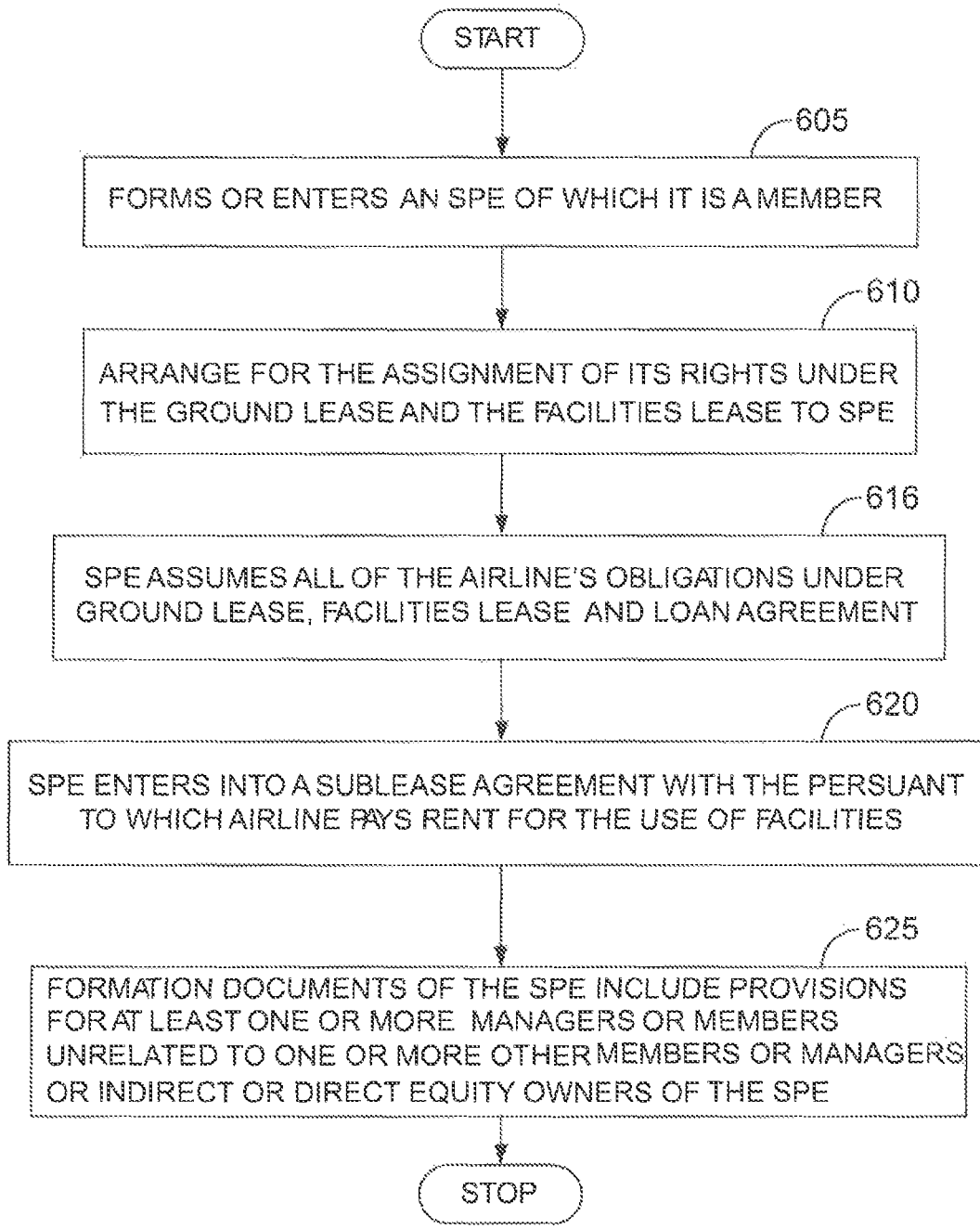
FIG. 6 illustrates various operations performed in connection with restructuring financing architectures in accordance with at least one embodiment of the invention.

A second example is provided regarding how at least one embodiment of the invention may be used to restructure a conventional "ground lease plus loan" architecture, as described relative to FIG. 6. Although, with reference to FIG. 5, consider an existing, conventional "ground lease plus loan" financing architecture 500, wherein a Municipal Entity 510 has entered into a ground lease 590 to a private water/sewer operating company or a municipal water/sewer facility operator 525 in return for ground lease rent payments 595; Municipal Entity 535 undertakes to issue revenue bonds 540 to finance the construction of the Municipal Facilities 545, with the CBSMB or other municipal bond proceeds 550 loaned to the public or private water/sewer operating company 525 under a loan agreement 565.

The Municipal Entity owner/ground lessor enters into a ground lease 525 with a water/sewer operating company. The water/sewer operating company conveys its ground lease position to an SPE, owned in whole or in part by the water/sewer operating company, third party private equity investors and/or the Municipal Entity. In return, the water/sewer operating company 525 takes back a Municipal Facilities lease from the SPE 580 (obligating itself to pay Municipal Facilities lease rent payments 585), with a term equal to the term of the ESFRBs 540. The rent payments to be made by the water/sewer operating company 585 under the Municipal Facilities lease 580 may include basic ground rent and additional facility rent. Additional rent is the component equal to annual property taxes and other annual charges, and costs as well of any debt service on any ESFRBs and any other payments and profit-sharing.

It is possible that the loan agreement 565 to the airport, water, sewer or any other municipal operating entity 525 may be unsecured. Alternatively, the loan obligation of the airport, water, sewer or any other municipal operating entity 525 to the bond issuer may be secured by a pledge of its Municipal Facilities ground lease 580 interest (e.g., a "leasehold mortgage"). In this architecture, the ground lease interest of the SPE and/or the water/sewer operating company Municipal Facility lease may or may not need to be pledged. The ground lease payments 595 may be fairly modest. In some cases, the ground lease 590 may include a cross-default provision, under which a default of the airport, water, sewer or any other municipal operating entity 525 under its loan agreement 565 with the Municipal Entity 530 is automatically an event of default under its ground lease 590 even if payments under that loan agreement are current.

In circumstances where this invention and architecture are not used and an SPE is not interposed between the Municipal Entity and the water/sewer operating company, a bankruptcy of the airport, water, sewer or any other municipal operating entity 525 may result in unacceptable events. In particular, if the airport, water, sewer or any other municipal operating entity 525 files in bankruptcy and ceases making payments under loan agreement 565, the bond trustee would be delayed from foreclosing on any leasehold mortgage interest in the Municipal Facilities lease 580 by the "automatic stay" bankruptcy rules. Thus, even though the Municipal Entity 535 would be a secured creditor in airport, water, sewer or any other municipal operating entity's 525 bankruptcy, it would be unable to compel a sale of the Municipal Facilities lease interest to other potential users of the Municipal Facilities 545. The Municipal Entity 535 might eventually receive some restructured monetary amount in settlement of its loan claim, on the resolution of airport, water, sewer or any other municipal operating entity's 525 bankruptcy proceeding; the airport, water, sewer or any other municipal operating entity's 525 possessory leasehold interests might then be sold to another public or private company, which might assume such rights on payment of some amounts in respect of unpaid ground lease rents and Municipal Facilities lease rents.

Additionally, if the airport, water, sewer or any other municipal operating entity assumes the Municipal Facilities lease and ground lease 580, 590 and continues to make the annual payments 585, 595 required thereunder, there would be no basis on that account for the Municipal Entity 510 to evict the airport, water, sewer or any other municipal operating entity 525 and make the Municipal Facilities 545 available to some other solvent party (which could also assume the loan payment obligations 570). Further, it is questionable whether an automatic cross-default provision in the Municipal Facilities lease or the ground lease 580, 590 (if it were triggered by a default under the water/sewer operating company's loan agreement 565 based solely on the water/sewer operating company's bankruptcy) would be enforceable. It may be that the cross-default provision would be a violation of the "ipso facto" rule, and therefore unenforceable, or would be subject to the "automatic stay" provisions of the bankruptcy laws.

If a airport, water, sewer or any other municipal operating entity 525 files in bankruptcy, and stops performing its obligations under the loan agreement 565 (resulting, after the exhaustion of any operating cost or debt service reserves, in a default in payments on the bonds 540 of the Municipal Entity 530), it may, in some instances, at the same time retain its possession and use of the financed Municipal Facilities 545. This would suspend any recovery rights of the bondholders (pending the eventual resolution of the bankruptcy proceedings), and in the meantime block the exercise by the Municipal Entity 510 or the bond trustee 535 of any right to dispossess the water/sewer operating company 525 and make the Municipal Facilities 545 available to other airlines or other companies that might be willing and able to pay for usage rights to the Municipal Facilities 545 in amounts sufficient to provide for current payments of debt service on the bonds 540.

In accordance with at least one embodiment of the invention wherein the water/sewer operating company is the equity owner of the SPE as opposed to a third party, airport, water, sewer or any other municipal operating entity 525 might undertake restructuring transactions as described with reference to FIG. 6. As illustrated in that figure, at 605, the airport, water, sewer or any other municipal operating entity may form an SPE of which it is the sole member, and alternatively, in some situations, share equity ownership with the Municipal Entity owner and/or third party private equity investors or be its only member. Subsequently, at 610, the owner or primary tenant of the airport, water, sewer or any other municipal operating entity and any third party private investors could then assign to the newly created SPE rights under the ground lease and the Municipal Facilities lease (including its rights to any rent prepayment credits thereunder, and any existing sublease agreements it might have with other parties); the SPE, however owned, would then assume all of the obligations of the airport, water, sewer or any other municipal operating entity under these agreements and the loan agreement at 615. Next, at 620, the SPE would enter into a sublease agreement with the airport, water, sewer or any other municipal operating entity, governing the airport, airlines, water, sewer or any other municipal operating entity's usage of the Municipal Facilities.

The sublease rent from the airport, water, sewer or any other municipal operating entity would be on terms sufficient to support the creditworthiness of the arrangement and to permit the conclusion that the sublease is either a short-term renewable sublease or is a longer term sublease which is a "true lease" for federal bankruptcy purposes. Subject to the transaction documents and applicable law, the water/sewer operating company, airlines, airports and other third party private equity owners of the SPE, if any, would be entitled to periodic distributions of a portion of any surplus revenue from the SPE.

At 625, the formation documents of the SPE, if a limited liability company, would be drafted to include provisions for at least one independent manager or one member or manager that is unrelated to any one or more members or direct or indirect equity holders and would include provisions precluding the SPE from taking certain actions including a voluntary filing in bankruptcy or a dissolution or liquidation, disposing of substantial assets, or amending its formation documents without the affirmative approval of the independent managers, if any, or members and managers which are unrelated to one another or the direct or indirect equity owners of the SPE. Those formation documents may also include a requirement that the SPE maintain compliance with one or more of the various customary standard "separateness" and other characteristics promulgated by the major rating agencies, as the same may be amended, modified, waived or ignored by such agencies from time to time. Similar restrictions could be included in the trust agreement if the SPE is a statutory trust.

Again, it should be understood that the actions performed in FIG. 6 are merely illustrative of particular implementation options in accordance with at least one embodiment of the invention. Therefore, it is not necessary that the actions be performed in the order illustrated in FIG. 6; rather, each of those actions may be performed in various orders including simultaneously. Moreover, it should be understood that practice of the invention may not require performing all of the operations set forth in that figure or that those operations be performed specifically by the party identified above but could be performed by one or more third party owners of the SPE, including any Municipal Entity owners.

Figure 7:
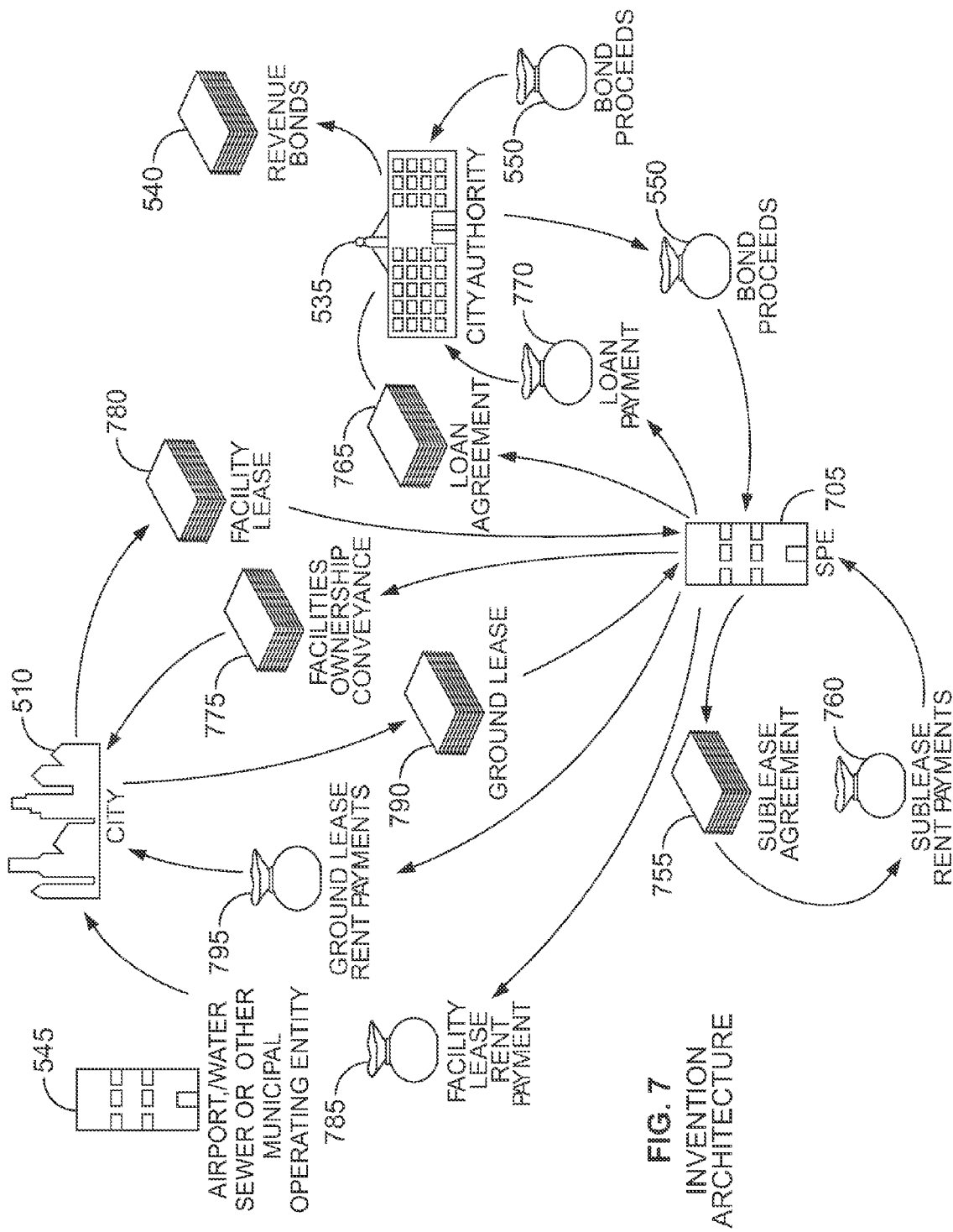
FIG. 7 illustrates a restructured financing architecture provided in accordance with at least one embodiment of the invention.

As illustrated in FIG. 7, subject to appropriate documentation, this restructured architecture might permit the CBSMBs 540 to be refinanced with ESFRBs based on the SPE legal structure, reliable future cash flows and strength of the demand for the essential services and improvements of the Municipal Facility, revenues held by the Municipal Facility and the perceived credit of the SPE 705. The airport, water, sewer or any other municipal operating entity 525 may be a member, and may be, in some situations, the only member of the SPE 705 or could share ownership with the Municipal Entity and/or third party private equity investors. The ground lessee's rights under the ground lease and the Municipal Facilities lease are assigned to the SPE 705 by the airport, airline, shipping company or any water, sewer or any other municipal operating entity 525, as the case may be. The SPE 705 assumes all of the airport, airline, shipping company or any water, sewer or any other municipal operating entity's obligations under the ground lease 790, the Municipal Facilities lease 780 and the loan agreement, if any 765. The SPE 705 enters into either a short-term renewable sublease agreement or a longer term sublease agreement meeting the requirements of a "true lease" 755 with the water/sewer operating company 525, covering the airport, water, sewer or any other municipal operating entity's usage of the Municipal Facilities (in return for sublease rent payments 760). The SPE may pledge 715 all of its rights and revenues under this sublease and other Municipal Facility revenue sources to secure its assumed obligations under the loan agreement 565 (and the SPE's obligation to the credit support provider, if applicable).

The sublease rent payments 760 from airport, airlines, water, sewer or any other municipal operating entity 525 plus any revenues derived by the SPE 705 with respect to the Municipal Facilities 545 from other sources include amounts sufficient, in the aggregate, to cover the SPE's cost of operation of the Municipal Facilities, including any administrative expenses, the SPE's continuing obligations under the ground lease 790 and Municipal Facilities lease 780 and the SPE's assumed obligations under the loan agreement 765. The SPE may pledge 715 all of its rights and revenues under this sublease is to secure its obligations under the loan agreement 565 (and the SPE's obligations to the credit support provider, if applicable) by conveying a leasehold mortgage to the trustee for the holders of the ESFRBs.

The formation documents of the SPE 705, if it is a limited liability company, may, or may not, include provisions for one or more independent managers or members unrelated to one or more other managers or members (appointed by, e.g., the host airport, the bond trustee, a credit support provider, if applicable, or a named neutral party, e.g., a trust company), and one or more provisions precluding the SPE 705 from taking certain actions (including a voluntary filing in bankruptcy or a dissolution or liquidation, disposition of substantial assets, or amendment of its formation documents), without the affirmative approval of the independent managers or one or more members unrelated to one or more other managers or members. The formation documents may, or may not, also include a requirement that the SPE 705 maintain compliance with one or more of the customary standard rating agency mandated "separateness" and other characteristics then required by the major rating agencies. Similar provisions would be included in a trust agreement if the SPE were designed as a statutory trust. For the avoidance of doubt, the owner(s) of the SPE need not cause the SPE formation documents to include all or any particular portion of such features so long as the end result is that the bonds are rated based on demand and revenues of the SPE as opposed to the credit of its owners or primary tenants or other users of the Municipal Facilities.

Assuming compliance in whole or in part with the "separateness" provisions, this restructured architecture may warrant a conclusion that the SPE 705 would be restricted from filing bankruptcy itself without the approval of one or more of its independent managers, if any, or all or more than one of its managers or members which are unrelated to one or more other direct or indirect owners or members of the SPE and "remote" from any substantive consolidation risk in a bankruptcy of the airport, airline, shipping company, water, sewer or any other municipal operating entity 525. In addition, the SPE 705 could not be dissolved and liquidated into bankruptcy without the approval of its independent managers, if any, or all or more than one of its managers or members which are unrelated to one or more other direct or indirect owners or members of the SPE. As a result, in the event of a bankruptcy of water/sewer operating company or the Municipal Entity owning the airport, airline, shipping company or water, sewer or any other municipal operating entity 525, or a default in payment of the water/sewer operating company's or airline or shipping company's sublease rent obligations, the SPE 705 (at the direction of its independent managers, if any, or one or more members unrelated to one or more other members or direct or indirect equity holders, the trustee, the Municipal Entity, the bond trustee, or any credit-support provider for the bonds, if applicable, as specified in the SPE's formation documents) should be entitled to demand that the airport, airline, shipping company or water, sewer or any other municipal operating entity 525 assume and perform its sublease 755 obligations to the SPE 705 in accordance with Section 365 and other applicable provisions of the U.S. Bankruptcy Code, or reject the sublease 755 and relinquish rights (e.g., possession) under the ground lease 790 and the Municipal Facilities lease 780 in favor of the SPE 705 and its assignees. In the latter case, under Section 365 of the U.S. Bankruptcy Code, the SPE 705 should then be in a position to make the ground lease 790 and Municipal Facilities lease 780 available to other airlines, shipping companies or water/sewer operating companies, on a basis that may enable the SPE 705 to continue making payments under the assumed loan agreement 765.

Additionally, the debt documents may obligate the SPE to enforce its rights against any lessees or sublessees. And, if the SPE 705 fails for some reason to enforce these rights, and the SPE's assumed obligations under the loan agreement 765 may be supported by leasehold mortgages on the SPE's interest in the ground lease 790 and Municipal Facilities lease 780, the bond trustee may be able to foreclose on such mortgages because the SPE is not in bankruptcy, free of any "automatic stay" restrictions imposed by the bankruptcy of the airport, water, sewer or any other municipal operating entity 525, and either sell the leasehold interests or re-sublease the ground and Municipal Facilities to other airlines, airport owners, shipping companies or water/sewer operating companies and other end users on a potentially profitable basis, for the benefit of the holders of the ESFRBs.

It should be understood that various embodiments of the invention enable the structuring of a financing architecture for new money as well as the restructuring of an existing financing architecture. The various embodiments of the invention may permit a Municipal Entity to avoid selling the applicable Municipal Facilities outright to a private entity to raise much needed cash or be used in connection with a privatization. Thus, the structuring of a new financing architecture such as those illustrated in FIGS. 4 and 7 or the like, is described.

In accordance with at least one embodiment of the invention, a water/sewer operating company and other interested parties might also undertake structured financing for new money in such a way as to provide a financing architecture that corresponds to a conventional "ground lease/lease assignment/subleaseback" financing architecture (see, e.g., architecture 100 in FIG. 1) but with the benefits associated with providing a bankruptcy-remote SPE responsible for repayment of ESFRBs. For example, such actions may be performed as illustrated with reference to FIG. 8. As illustrated in that figure, at 805, an SPE may be formed and be treated as a "disregarded entity" by the water/sewer operating company or other equity holder for federal income tax purposes. Subsequently, at 810, the SPE's formation documents (whether as a trust or a limited liability company) may, or may not, include one or more provisions mandated by the major rating agencies, including without limitation, for example, one or more provisions maintaining "separateness" from the water/sewer operating company or other equity holders appropriate for bankruptcy-remote status, and preventing certain actions from being taken without the approval of its independent managers, if any, or its members or managers unrelated to one or more other members or managers or direct or indirect equity owners (as explained above). Similar provisions would be included in a trust agreement if the SPE is structured as a statutory trust. Subsequently, at 815, the SPE enters into a ground lease and a Municipal Facilities sublease, with the relevant parties (e.g., any private operating company and/or Municipal Entity). Then, at 820, the airport, water, sewer or any other municipal operating entity may enter into a sublease of the Municipal Facilities meeting the requirements of a "true lease" with the SPE for the water/sewer operating company's own use of the Municipal Facilities. At 825, the SPE also enters into sub-subleases of the Municipal Facilities with other airport, water, sewer or any other municipal operating entities and other interested parties. Those sub-subleases may be short-term renewable leases or longer term leases meeting the requirements of a "true lease" may entail, for example, the water/sewer operating company and other interested parties agreeing to pay a rent sufficient to support the creditworthiness of the arrangement and to permit the conclusion that any such sub-sublease is also a "true lease" for federal bankruptcy purposes. Then, at 830, all rights and revenues of the SPE may be pledged, by leasehold mortgage or otherwise, to secure its lease obligations supporting the bonds (and any obligations to the credit support provider, if applicable).

Subsequently, at 835, an issuer issues the ESFRBs, supported only by the SPE obligations. The SPE may then, at 840, be identified as solely responsible on any related credit-support arrangements for the ESFRBs.

A determination may then be made, at 845, as to whether the SPE should reserve some portion of its revenues in a lease reserve fund to provide greater assurance of its ability to pay lease or sublease rent payments on a timely basis, e.g., create a lease reserve fund to cover rental payments during any relet period. If it is determined that such a fund should be created, associated actions would be performed at 850 and continue to be performed at 855. That practice may, however, be subject to arbitrage yield restrictions applicable to pledged funds. If it was determined that no such fund is necessary, the appropriate documentation of the actions performed in FIG. 8 would be made at 855. As a result, of such actions, a financing architecture may be provided as illustrated in FIG. 4.

Figure 8:
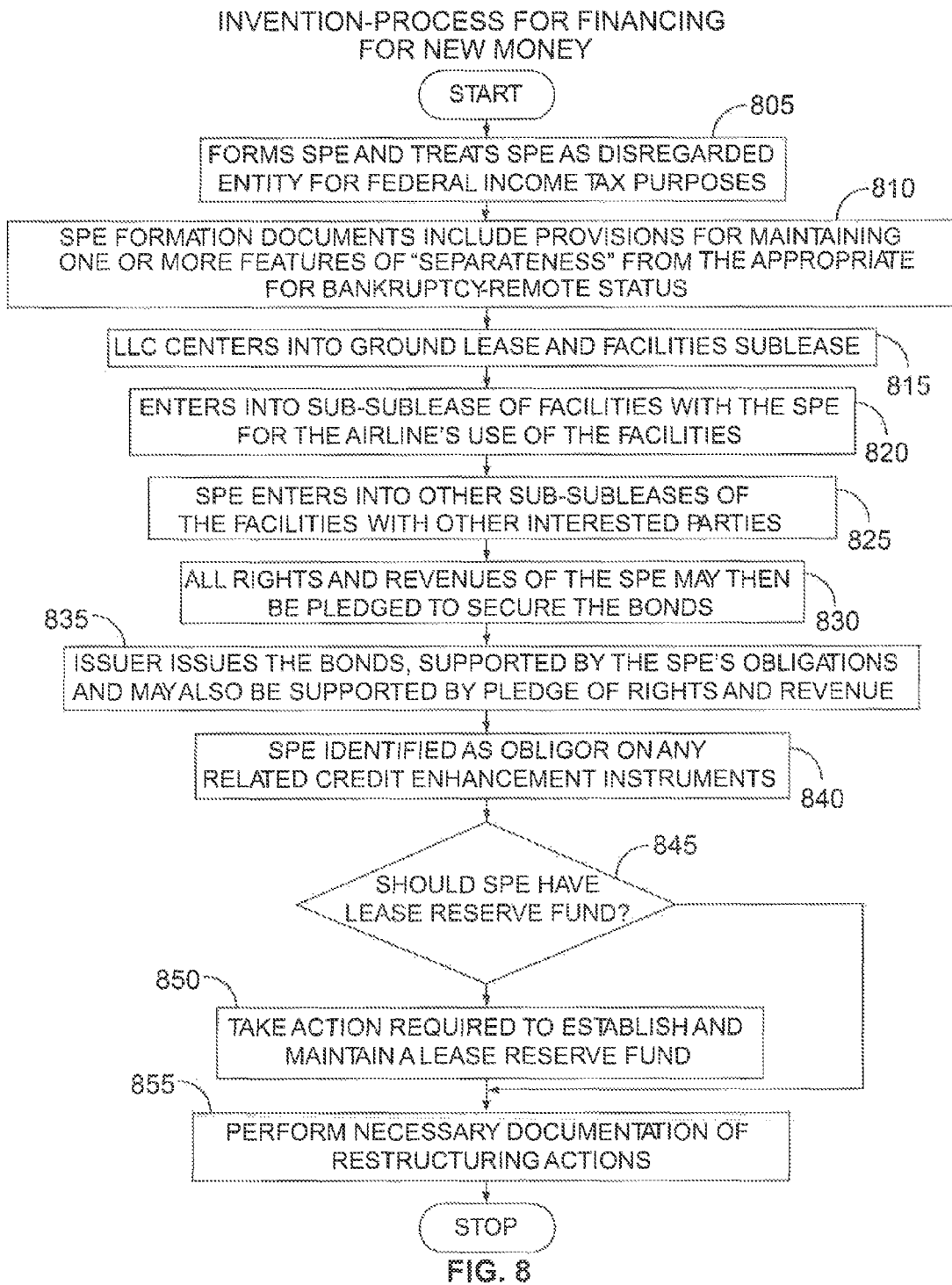
FIG. 8 illustrates various operations performed in connection with structuring of financing architectures in accordance with at least one embodiment of the invention.

It should be understood that the actions performed in FIG. 8 are merely illustrative of particular implementation options in accordance with at least one embodiment of the invention. Therefore, it is not necessary that the actions be performed in the order illustrated in FIG. 8; rather, each of those actions may be performed in various orders including simultaneously. Moreover, it is not necessary that the SPE be owned in whole or in part by the Municipal Entity, the airline, the shipping company, the water/sewer operating company or any other third party private equity investors or that it be organized in a particular jurisdiction. Moreover, it should be understood that practice of the invention may not require performing all of the operations set forth in that figure or that those operations be performed specifically by the party identified above.

Similarly, in accordance with at least one embodiment of the invention, an airport, a Municipal Entity, water/sewer operating company, third party private equity holders and other interested parties might undertake structuring financing transactions in such a way as to provide a financing architecture that corresponds to a conventional "ground lease plus loan" financing architecture (see, e.g., architecture in FIG. 5) but with the benefits associated with providing for a bankruptcy-remote SPE to be the ground lessee and the borrower under the loan agreement responsible for repayment of the ESFRBs. For example, such actions may be performed towards such an end as illustrated with reference to FIG. 9. As illustrated in that figure, at 905, an SPE is formed of which the airport, water, sewer or any other municipal operating entity may be the only member (but could also have the Municipal Entity, airline or shipping company as a member or several third party private equity investors as members unrelated to the Municipal Entity). Subsequently, at 910, the SPE enters into the ground lease, Municipal Facilities lease and loan agreement with the Municipal Entity.

At 915, the SPE enters into a sublease agreement with the airport, water, sewer or any other municipal operating entity, covering the airport, water, sewer or any other municipal operating entity's usage of the Municipal Facilities. The sublease rent from the airport, water, sewer or any other municipal operating entity together with any revenues derived by the SPE with respect to the Municipal Facilities from other sources, including other sublease rental income from other airlines, shipping companies, entities and end users of its services would, in the aggregate, be on terms sufficient to support the creditworthiness of the arrangement and to permit the conclusion that the sub-sublease is either a short-term renewable lease or a longer term lease that is a "true lease" for federal bankruptcy purposes.

At 920, the formation documents of the SPE, if it is a limited liability company, may be drafted to include provisions for one or more independent managers or one or more members unrelated to one or more other members or direct or indirect equity owners and may include provisions precluding the SPE from taking certain actions (including a voluntary filing in bankruptcy or a dissolution or liquidation, a disposition of substantial assets, or an amendment to its formation documents) without the affirmative approval of the independent managers, if any, or one or more members unrelated to one or more other members or direct or indirect equity owners. The formation documents may also include a requirement that the SPE maintain compliance with one or more of the various, customary standard "separateness" characteristics (as explained above). Similar provisions would be included in a trust agreement if a statutory trust were used as the SPE instead of a limited liability company. At 925, the ESFRBs are financed on the strength of demand for use of the essential services and improvements furnished by the Municipal Facility and the legal attributes and credit of the SPE. For the avoidance of doubt, the owner(s) of the SPE need not cause the SPE formation documents to include all or any particular portion of such features so long as the end result is that the bonds are rated based on demand and revenues of the SPE as opposed to the credit of its owners or primary tenants or other users of the Municipal Facilities.

As a result, of such actions, a financing architecture may be provided as illustrated in FIG. 7, or the like.

Figure 9:
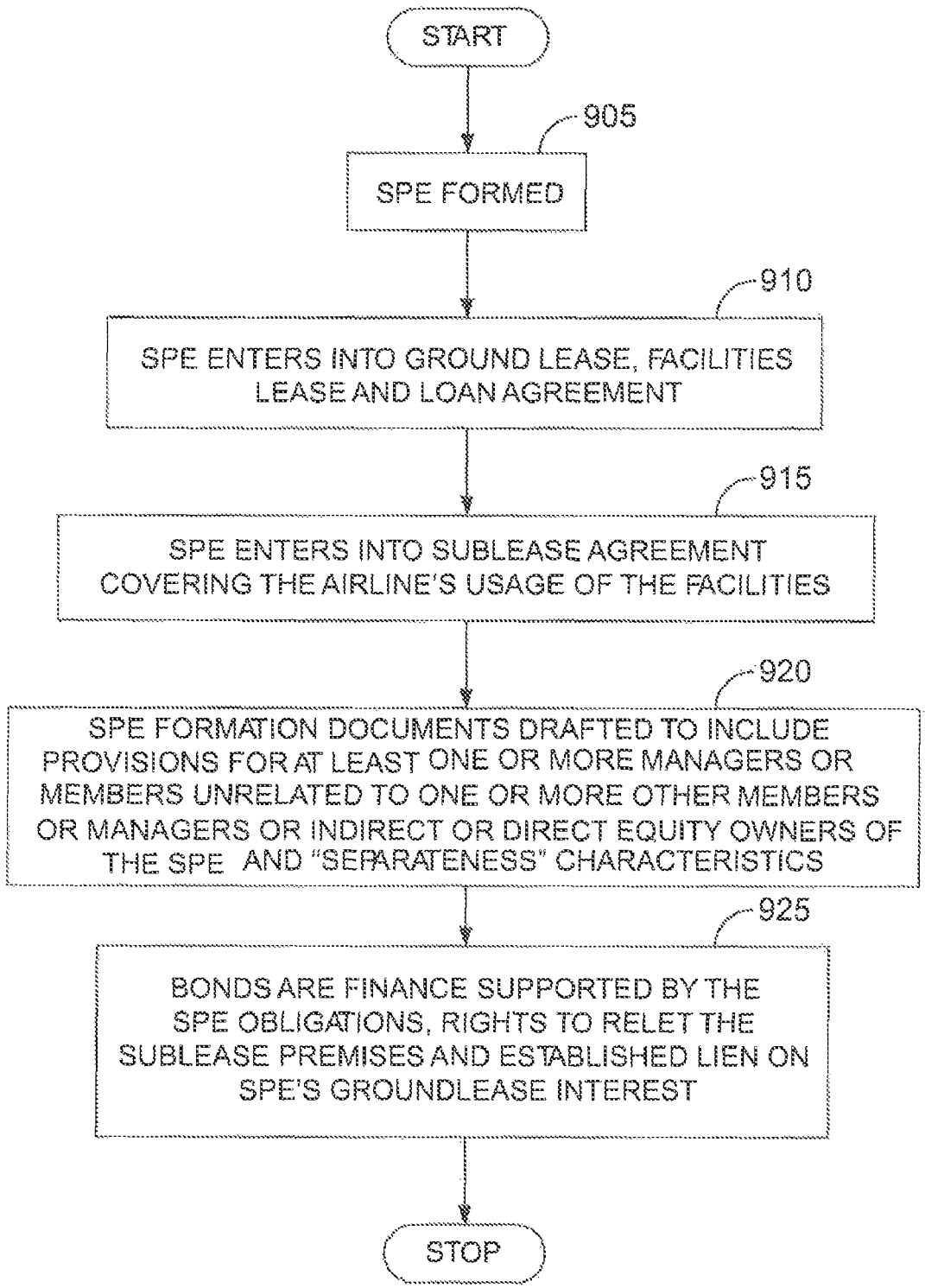
FIG. 9 illustrates various operations performed in connection with structuring of financing architectures in accordance with at least one embodiment of the invention.

Again it should be understood that the actions performed in FIG. 9 are merely illustrative of particular implementation options in accordance with at least one embodiment of the invention. Therefore, it is not necessary that the actions be performed in the order illustrated in FIG. 9; rather, each of those actions may be performed in various orders including simultaneously. Moreover, it should be understood that practice of the invention may not require performing all of the operations set forth in that figure or by the party identified above.

As alluded to above, it should be understood that various embodiments of the invention have been disclosed herein and interrelated issues and factors are worth consideration by one of ordinary skill For example, the same principle and structure is applicable to Municipal Entity-owned seaports, airports, bus or train transport services or municipal parking lots. Another application of the present principle and structure is an energy project, such as a cogeneration facility, windfarm facility, improvements to oil refineries or any other suitable type of energy production facility as recognized by one skilled in the art.

From a tax standpoint, there may be a number of federal income tax issues relevant to structuring or restructuring performed in accordance with embodiments of the invention. Potential issues seem to arise in three areas: (1) consequences of the structured/restructured transaction; (2) consequences of operations under the resulting financing architecture; and (3) implications for an existing or new tax-exempt, tax credit, or taxable bond financing of the Municipal Facilities.

An assignment of the rights of the airport, water, sewer or any other municipal operating entity under the ground lease and Municipal Facilities sublease to the SPE should have no federal income tax effect, because the SPE is meant to be treated in effect as a mere branch of the airport, water, sewer or any other municipal operating entity (if the airport, water, sewer or any other municipal operating entity is the only member), or a partnership (if two or more airports, water, sewer or any other municipal operating entities are members) for federal income tax purposes. As a result, the assignments should not be treated as a taxable transaction. Tax treatment will differ if the SPE is not owned by the water/sewer operating company transferor.

There may be some instances in which the Municipal Facilities are presently jointly-operated by two or more airport, water, sewer or any other municipal operating entities, either as a joint venture or through some common legal entity. In such a situation, in accordance with at least one embodiment of the invention, contributing existing rights to a conduit SPE, or contributing interests in an ownership entity to one or more SPEs may achieve the federal income tax effect noted above.

In the case of a single-member SPE, if the SPE is a "disregarded entity" of the water/sewer operating company, its operations, revenue and expenses should have no different federal income tax effect to the water/sewer operating company as a result of the restructure architecture, even if the contractual arrangements between the entities involve a sub-sublease payment obligation from the airport, water, sewer or any other municipal operating entity to the SPE. However, if multiple airport, water, sewer or any other municipal operating entities and/or third party private equity investors are the sponsoring parties, further analysis would be required to determine the effects of restructuring the financing architecture as described above; nevertheless, the potential for partnership treatment of an interposed SPE (or for interposed SPEs of each participating water/sewer operating company) is possible under federal income tax regulations.

In the case of the structuring of a financing architecture for new money, it does not appear that methods and architectures designed in accordance with the invention would involve any significantly different tax-exempt financing considerations than a financing for the direct benefit of the airport, water, sewer or any other municipal operating entity. However, when an existing, outstanding tax-exempt issue of CBSMBs or other bonds is involved, other considerations may be relevant. In particular, the form of a restructured architecture designed in accordance with at least one embodiment of the invention will involve a refunding of any existing outstanding bonds that are callable.

In general, if the CBSMBs or other bonds were issued after 1986, the refunding may not present any new or different federal income tax issues for tax-exempt purposes.

If, however, the existing bonds were issued before the effective date of the 1986 Tax Reform Act, there may be a question whether the refunding bonds qualify under transition rules of the 1986 Act, without regard to the new standards for facilities financings that were first imposed by that Act. This conclusion might be more easily reached if the SPE is a single-member entity of the airport, water, sewer or any other municipal operating entity, rather than a common entity of more than one airport, water, sewer or any other municipal operating entity and/or third party private equity investors;

however, if any change occurs through the interposition of entities above that level, there may be no basis for a distinction.

On the other hand, if the refunding of a pre-1986 bond issue would not be eligible for transition-rule protection, evaluation may need to be performed by tax and bond counsel in light of the changes that have since occurred.

Beyond these tax implications, there may be additional issues posed by the structuring or restructuring of a financing architecture and associated processes. In particular, for example, if a restructured financing architecture requires some accumulation of revenues or third party private equity contributions at the level of the SPE, for the better assurance of the credit of the bonds (or the credit-support provider, if applicable), care may need to be exercised to assure either that such funds do not constitute "replacement proceeds" of the bonds, subject to an investment yield limitation not greater than the yield of the bonds, or that they comply with such limitations. It is possible that such limitations could be avoided by providing that any such accumulated funds are not pledged for payment of sublease rent, and are at all times subject to debit, if necessary, to pay operating costs of the SPE. If depressed yields are available for temporary investments, this may not be a practical problem, but a method of assuring compliance may need to be considered.

In addition, and wholly apart from the above, any particular restructuring along the lines herein disclosed may require evaluation of relevant state or local income or other tax issues.

Further, it should be understood that the effect of structuring or restructuring financing architectures in accordance with various embodiments of the invention primarily depends, in each case, on the essentiality of the Municipal Facilities and the projected strong demand for use of the essential services or improvements furnished by the Municipal Facilities by consumers and others. Thus, the structuring or restructuring of financing architectures with and SPE cannot guarantee a successful result without the requisite essentiality and demonstrable demand for use of the services or improvements furnished by the Municipal Facilities.

Nevertheless, the financing processes and architectures provided in accordance with embodiments of the invention may prevent a ground lease and a Municipal Facilities lease from being frozen in a possible bankruptcy of a water/sewer operating company, for example, while associated bonds are in default.

While the embodiments of the present invention may have been explained with regard to particular examples of implementation of various embodiments of the invention in the context of a water/sewer provider, it should be understood that many alternatives, modifications and variations will be apparent to those skilled in the art. Accordingly, the exemplary embodiments of the invention, as set forth above, are intended to be illustrative, not limiting. Various changes may be made without departing from the spirit and scope of the invention.

For example, although implementations of particular embodiments of the invention have been described in connection with a single airport, water, sewer or any other municipal operating entity, it should be understood that the invention may be practiced in connection with the financing or refinancing of all manner of Municipal Facilities and for more than one water/sewer operating company, for example, a group or consortium of water/sewer operating companies and third party private equity investors, or may be applied in a financing or refinancing of a maritime cargo and/or airport passenger or cargo terminal or berth, toll bridges or toll roads, train depots, bus and train transit services, water/sewer projects or energy projects with demonstrable demand for use of the essential services furnished by such Municipal Facilities.

It is also noted that the present invention is applicable for performed or executed in a computing environment, for example the computing of a credit rating for the financing as noted above. The loan and bond financing structure can be implemented in a computer-implemented environment including processing operations performed by a computer-processing device. For example, a physical processor may perform computational processing operations in response to executable code physically stored in a computer readable medium.

FIGS. 1-9 are conceptual illustrations allowing for an explanation of the present invention. It should be understood that various aspects of the embodiments of the present invention could be implemented in hardware, firmware, software, or combinations thereof. In such embodiments, the various components and/or steps would be implemented in hardware, firmware, and/or software to perform the functions of the present invention. That is, the same piece of hardware, firmware, or module of software could perform one or more of the illustrated blocks (e.g., components or steps).

In software implementations, computer software (e.g., programs or other instructions) and/or data is stored on a machine readable medium as part of a computer program product, and is loaded into a computer system or other device or machine via a removable storage drive, hard drive, or communications interface. Computer programs (also called computer control logic or computer readable program code) are stored in a main and/or secondary memory, and executed by one or more processors (controllers, or the like) to cause the one or more processors to perform the functions of the invention as described herein. In this document, the terms "machine readable medium," "computer program medium" and "computer usable medium" are used to generally refer to media such as a random access memory (RAM); a read only memory (ROM); a removable storage unit (e.g., a magnetic or optical disc, flash memory device, or the like); a hard disk; or the like.

Notably, the figures and examples above are not meant to limit the scope of the present invention to a single embodiment, as other embodiments are possible by way of interchange of some or all of the described or illustrated elements. Moreover, where certain elements of the present invention can be partially or fully implemented using known components, only those portions of such known components that are necessary for an understanding of the present invention are described, and detailed descriptions of other portions of such known components are omitted so as not to obscure the invention. In the present specification, an embodiment showing a singular component should not necessarily be limited to other embodiments including a plurality of the same component, and vice-versa, unless explicitly stated otherwise herein. Moreover, applicant does not intend for any term in the specification or claims to be ascribed an uncommon or special meaning unless explicitly set forth as such. Further, the present invention encompasses present and future known equivalents to the known components referred to herein by way of illustration.

The foregoing description of the specific embodiments will so fully reveal the general nature of the invention that others can, by applying knowledge within the skill of the relevant art(s) (including the contents of the documents cited and incorporated by reference herein), readily modify and/or adapt for various applications such specific embodiments, without undue experimentation, without departing from the general concept of the present invention. Such adaptations and modifications are therefore intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance presented herein, in combination with the knowledge of one skilled in the relevant art(s).

What is claimed is:

1. A process for obtaining financing, the process comprising:
   forming or acquiring an interest in an SPE, with at least one operating requirement that establishes separateness of the SPE from a Municipal Entity or one or more separate business entities;
   arranging for the transfer or assignment of the Municipal Entity's or one or more separate business entities' Municipal Facility or lease obligations to the SPE;
   arranging for the transfer or assignment of rights to revenues of the Municipal Facility to the SPE;
   forming a lessee or loan or other contractual relationship with the SPE wherein one or more third parties pay revenues to the SPE;
   engaging a rating agency to determine, in a programmed machine, computer-generated credit factors, including essentiality and demonstrable demand for the use of services or improvements furnished by the Municipal Facilities;
   requesting that the credit rating agency assign a credit rating for the financing, based on the SPE legal structure and the credit factors and reliable projected revenues of the SPE, the assigned credit rating being superior to a credit rating available to the Municipal Entity owner of the Municipal Facilities or one or more business entities primarily operating or using the Municipal Facilities;
   securing ESFRB financing for the Municipal Facilities on a basis of obtaining the assigned credit rating including issuing ESFRBs with a rating established at least in part in view of the legal protections afforded by the separateness of the SPE and the demand for the essential services and improvements furnished by such Municipal Facilities; and
   allocating the funds financing for purchase, construction or renovation of Municipal Facilities.

2. The process of claim 1, wherein there are existing bonds for the Municipal Facility and wherein the step of securing ESFRB financing includes replacing the existing municipal bonds with new bonds having a rating established at least in part in view of the legal protections afforded by use of an SPE and the demand for the essential services or improvements furnished by such Municipal Facility.

3. The process of claim 1, wherein the arranging for the transfer or assignment steps, forming and securing steps restructure financing architecture concerns one of a lease, a ground lease, a lease assignment, a sublease; and other contractual relationship.

4. The process of claim 1, wherein the forming or acquiring step having at least one operating requirement that establishes separateness of the SPE from the one or more separate business entities comprises including at least one manager unrelated to one or more separate business entities owning interests, directly or indirectly in the SPE, in the event such SPE is structured in the form of a limited liability company, and a separate trustee in the event such SPE is structured in the form of a statutory trust.

5. The process of claim 1, wherein the bond financing is for at least one of: a municipal bond issue or a private activity bond issue.

6. A process for obtaining financing, the process comprising:
   forming or acquiring an interest in an SPE, with at least one operating requirement that establishes separateness of the SPE from any one of a Municipal Entity owner, one or more separate public or private businesses and/or third party equity investors;
   arranging for the transfer or assignment of Municipal Facility obligations, in whole or in part, to the SPE;
   arranging for the transfer or assignment of rights to revenues of the Municipal Facility to the SPE;
   forming a lessee or other contractual relationship with the SPE wherein one or more third parties pay revenues to the SPE;
   engaging a rating agency to determine, in a programmed machine, computer-generated demand and other credit factors for the financing;
   requesting that the credit rating agency assign a credit rating for the financing, based on the demonstrable demand for the services furnished by the Municipal Facilities and other credit factors and the revenues of the SPE, the assigned credit rating being superior to a credit rating available to any of the Municipal Entity that owns the Municipal Facilities or third party private equity investors or one or more business entities using or operating the Municipal Facilities;
   securing bond financing for the Municipal Facility on a basis of obtaining the assigned credit rating including issuing bonds with a rating established at least in part in view of the legal protections afforded by use of SPE and the essentiality and demonstrable demand for the services or improvements furnished by such Municipal Facility; and
   allocating the funds financing for purchase, construction or renovation of, or operating capital for, a water/sewer facility.

7. The process of claim 6, wherein there are existing bonds for the Municipal Facility and wherein the step of securing bond financing includes replacing the existing bonds with new bonds having a rating established at least in part in view of the demonstrable demand for the essential services or improvements afforded by such Municipal Facilities.

8. The process of claim 6, wherein the arranging for the transfer or assignment steps, forming and securing steps restructure financing architecture concerning one of a lease, a ground lease, a lease assignment, a sublease, and an other contractual arrangement.

9. The process of claim 6, wherein the forming or acquiring step having at least one operating requirement that establishes separateness of the SPE from any one of the Municipal Entity, public or private operator and/or third party private equity investors and/or one or more separate business entities comprises including at least one manager unrelated to one or more separate business entities, owning interests, directly or indirectly, in the SPE, if the SPE is a limited liability company, and separate trustee if the SPE is in the form of a statutory trust.

10. The process of claim 6, wherein the bond financing is for at least one of: a municipal bond issue or a private activity bond issue.

11. A process for obtaining financing, the process comprising:
   forming or acquiring an interest in an SPE, with at least one operating requirement that establishes separateness of the SPE from a Municipal Entity owner and one or more separate public or private business entities;

arranging for the transfer or assignment of the one or more separate business entities' Municipal Facility lease obligations, in whole or in part, to the SPE;

arranging for the transfer or assignment of rights to revenues of the Municipal Facility to the SPE;

forming a lessee or sublessee or other contractual relationship with the SPE wherein one or more third parties pay the revenues to the SPE;

engaging a rating agency to determine, in a programmed machine, computer-generated demand, essentiality and other credit factors for the ESFRB financing;

requesting that the credit rating agency assign a credit rating for the financing, based on the demand and other credit factors and the revenues of the SPE, the assigned credit rating being superior to a credit rating available to any one of the Municipal Entity owner, primary operators, third party private equity investors and/or one or more business entities using the Municipal Facilities;

securing bond financing for the Municipal Facility on a basis of obtaining the assigned credit rating including issuing bonds with a rating established at least in part in view of the essentiality of services, the legal protections afforded by use of an SPE and the demand for the services and/or improvements furnished by such Municipal Facility; and allocating the funds financing for purchase, construction or renovation of a water/sewer service entity.

12. The process of claim 11, wherein there are existing outstanding bonds for the Municipal Facility and wherein the step of securing ESFRB financing includes replacing the existing bonds with new bonds having a rating established not solely on the basis of the credit of the Municipal Entity owner or water/sewer operating company but at least in part in view of the protections afforded by the SPE legal structure and the strong demand for the essential services and/or improvements furnished by such Municipal Facilities.

13. The process of claim 11, wherein the arranging for transfer or assignment steps, forming and securing steps restructure financing architecture concerns one of a ground lease, a lease, a lease assignment, a sublease, and other contractual arrangement.

14. The process of claim 11, wherein the forming or acquiring step, when using a limited liability company as the SPE, requires the SPE having at least one operating requirement that establishes separateness of the SPE from any of the Municipal Entity owner or one or more separate business entities, including at least one manager unrelated to any one of the Municipal Entity owner or one or more separate business entities owning interests, directly or indirectly, in the SPE, and a separate trustee in the event the SPE is structured as a statutory trust.

15. The process of claim 11, wherein the ESFRB financing is for at least one of: a municipal bond issue or private activity bond issue.

16. A process for obtaining financing, the process comprising:

forming or acquiring an interest in a single-purpose business entity (SPE), with at least one operating requirement that establishes separateness of the single-purpose business entity from one or more separate business entities;

arranging for the transfer or assignment of the one or more separate business entities' facility or equipment lease obligations, in whole or in part, to the SPE, wherein the one or more separate business entities' facility or equipment lease obligations relate to the operation of an airport, airline terminal, airport related facility or equipment;

arranging for the transfer or assignment of the rights to revenues of the airport, airline terminal, airport-related facility or equipment to the SPE;

forming a lessee or other contractual relationship with the single-purpose entity wherein a third party pays the revenues to the SPE;

obtaining a rating from a rating agency, wherein the rating agency computes, in a programmed machine, a credit rating for the financing using a formula that has as a parameter the revenues of the SPE, the computed credit rating being superior to a credit rating available to any one or more business entities or any airline entitled to use the airport, airline terminal, airport related facility or equipment or having a direct or indirect ownership interest in the SPE;

securing bond financing for the airport, airline terminal, airport related facility or equipment on the basis of the computed credit rating including issuing bonds with a rating established at least in part in view of the airport, airline terminal, airport related facility or equipment; and allocating the funds financing for the purchase, construction or renovation of an airport, airline terminal, airport-related facility or equipment.

17. The process of claim 16, wherein there are existing bonds for the airport, airline terminal, airport related facility or equipment and wherein the step of securing bond financing includes replacing the existing bonds with new bonds having a rating established at least in part in view of a facility or equipment, as applicable.

18. The process of claim 16, wherein the entering into or joining, arranging for the acquisition of or transfer of, arranging for the acquisition of or assignment of, and obtaining steps restructure financing architecture-concerning any one of a ground lease, a lease, a lease assignment, a sublease and an other contractual arrangement.

19. The process of claim 16, wherein the forming or acquiring step having the at least one operating requirement that establishes separateness of the single-purpose business entity from the one or more separate business entities comprises including at least one manager unrelated to one or more separate business entities or any airline having a direct or indirect ownership interest in the SPE.

20. A process for obtaining financing, the process comprising:

forming or acquiring an interest in a single-purpose business entity (SPE), with at least one operating requirement that establishes separateness of the single-purpose business entity from one or more separate business entities;

arranging for the transfer or assignment of the one or more separate business entities' facility or equipment lease obligations to the SPE;

arranging for the transfer or assignment of the rights to revenues of the facility or equipment to the SPE;

forming a lessee or other contractual relationship with the single-purpose entity wherein a third party pays revenues to the SPE;

obtaining a rating from a rating agency, wherein the rating agency computes, in a programmed machine, a credit rating for the financing using a formula that has as a parameter the revenues of the SPE, the computed credit rating being superior to a credit rating available to the one or more business entities;

securing bond financing for the facility or equipment on a basis of the computed credit rating including issuing bonds with a rating established at least in part in view of a facility or equipment; and allocating the funds for purchase, construction or renovation of a maritime port.

21. A process for obtaining financing, the process comprising:

forming or acquiring an interest in a single-purpose business entity (SPE), with at least one operating requirement that establishes separateness of the SPE from one or more separate business entities including at least one manager unrelated to one or more separate business entities and establishing the SPE-to not be authorized to liquidate or to file in bankruptcy without approval of all of its members;

arranging for the transfer or assignment of the one or more separate business entities' facility or equipment lease obligations to the SPE;

arranging for the transfer or assignment of the rights to revenues of the facility or equipment to the SPE;

forming a lessee or other contractual relationship with the single-purpose entity wherein a third party pays revenues to the SPE;

obtaining a rating from a rating agency, wherein the rating agency computes, in a programmed machine, a credit rating for the financing using a formula that has as a parameter the revenues of the SPE, the computed credit rating being superior to a credit rating available to the one or more business entities;

securing bond financing for the facility or equipment on a basis of the computed credit rating including issuing bonds with a rating established at least in part in view of a facility or equipment.

\* \* \* \* \*